(12) United States Patent
Srivastava et al.

(10) Patent No.: US 12,524,922 B2
(45) Date of Patent: *Jan. 13, 2026

(54) ENCODING THREE-DIMENSIONAL DATA FOR PROCESSING BY CAPSULE NEURAL NETWORKS

(71) Applicant: APPLE INC., Cupertino, CA (US)

(72) Inventors: Nitish Srivastava, San Francisco, CA (US); Ruslan Salakhutdinov, Pittsburgh, PA (US); Hanlin Goh, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,488

(22) Filed: Jun. 10, 2024

(65) Prior Publication Data

US 2024/0331207 A1 Oct. 3, 2024

Related U.S. Application Data

(63) Continuation of application No. 16/836,028, filed on Mar. 31, 2020, now Pat. No. 12,008,790.
(Continued)

(51) Int. Cl.
*G06T 9/00* (2006.01)
*G06N 3/047* (2023.01)
(Continued)

(52) U.S. Cl.
CPC .............. *G06T 9/002* (2013.01); *G06N 3/047* (2023.01); *G06N 3/08* (2013.01); *H04N 13/111* (2018.05); *H04N 13/161* (2018.05)

(58) Field of Classification Search
CPC ......... G06T 9/002; G06T 9/001; G06N 3/047; G06N 3/08; G06N 3/045; H04N 13/111; H04N 13/161
See application file for complete search history.

(56) References Cited

U.S. PATENT DOCUMENTS

| 10,496,104 B1 | 12/2019 | Liu et al. |
| 2019/0035099 A1 | 1/2019 | Ebrahimi Afrouzi et al. |

(Continued)

FOREIGN PATENT DOCUMENTS

| CN | 108921106 A | 11/2018 |
| CN | 109345575 A | 2/2019 |

(Continued)

OTHER PUBLICATIONS

Zhao, Y., et al., "3D Point Capsule Networks", Jul. 11, 2019, https://arxiv.org/abs/1812.10775 v2 (14 pp).
(Continued)

*Primary Examiner* — Nasim N Nirjhar
(74) *Attorney, Agent, or Firm* — Young Basile Hanlon & MacFarlane, P.C.

(57) ABSTRACT

A method includes receiving three-dimensional geometric elements as an input. The method also includes initializing geometric capsules by assigning one of the three-dimensional geometric elements to each of the geometric capsules and setting initial values for a pose component and a feature component of each of the geometric capsules. The method also includes one or more iterations of a routing procedure that includes assigning an additional one of the three-dimensional geometric elements to a respective one of the geometric capsules, based on correspondence of the additional one of the three-dimensional geometric elements to a surface defined based on the feature component of the respective one of the geometric capsules, and updating the feature component of each of the geometric capsules based on the three-dimensional geometric elements assigned to each of the geometric capsules. The method also includes outputting the geometric capsules including encoded three-dimensional data.

20 Claims, 6 Drawing Sheets

Related U.S. Application Data

(60) Provisional application No. 62/904,890, filed on Sep. 24, 2019.

(51) Int. Cl.
*G06N 3/08* (2023.01)
*H04N 13/111* (2018.01)
*H04N 13/161* (2018.01)

(56) References Cited

U.S. PATENT DOCUMENTS

| | | | |
|---|---|---|---|
| 2019/0057509 A1* | 2/2019 | Lv | G06T 7/11 |
| 2019/0130603 A1* | 5/2019 | Sun | G06N 3/045 |
| 2019/0147234 A1* | 5/2019 | Kicanaoglu | G06N 3/047 |
| | | | 382/218 |
| 2019/0188533 A1 | 6/2019 | Katabi et al. | |
| 2020/0005480 A1* | 1/2020 | Murase | G06N 20/00 |
| 2020/0184314 A1* | 6/2020 | Krishnamoorthy | G06V 10/764 |
| 2020/0237319 A1* | 7/2020 | Yi | G06T 7/0012 |
| 2020/0285934 A1* | 9/2020 | Hinton | G06N 3/04 |

FOREIGN PATENT DOCUMENTS

| | | |
|---|---|---|
| CN | 110120097 A | 8/2019 |
| WO | 2019068141 A1 | 4/2019 |

OTHER PUBLICATIONS

Yu, Andrew C., "CS230 Project: 2D Character Sketches to 3D Models", https://www.google.com/search?client=firefox-b-1-d&q=CS230+Project%3A+2D+character, 2018 (7 pp).

Wen, X., et al., "Point2SpatialCapsule: Aggregating Features and Spatial Relationships of Local Regions on Point Clouds using Spatial-aware Capsules", Journal of Latex Class Files, vol. 14, No. 8, Aug. 2019, https://arxiv.org/abs/1908.11026 (13 pp).

Hinton, G.E., et al., "Transforming Auto-encoders", https://www.cs.toronto.edu, ~hinton, absps, transauto6, Jun. 14, 2011 (8 pp).

Chang, A.X., et al., "ShapeNet: An Information-Rich 3D Model Repository", https://arxiv.org/abs/1512.03012 Dec. 2015 (11 pp).

Kosiorek, A. R., et al., "Stacked Capsule Autoencoders", https://arxiv.org/abs/1906.06818 Jun. 2019 (13 pp).

Sabour, S., et al., "Dynamic Routing Between Capsules", 31st Conference on Neural Information Processing Systems (NIPS 2017) (11 pp).

Wang, Y., et al., "Deep Closest Point: Learning Representations for Point Cloud Registration", https://arxiv.org/abs/1905.03304 v1, May 8, 2019 (10 pp).

Yang, Y., et al., "FoldingNet: Point Cloud Auto-encoder via Deep Grid Deformation", https://arxiv.org/abs/1712.07262 Dec. 2017 (10 pp).

Wu, Z., et al., "3D ShapeNets: A Deep Representation for Volumetric Shapes", https://ieeexplore.ieee.org/document/7298801, 2015 IEEE Conference on Computer Vision and Pattern Recognition Jun. 2015 (9 pp).

Yang, J., et al., "Go-ICP: A Globally Optimal Solution to 3D ICP Point-Set Registration", https://arxiv.org/abs/1605.03344 May 11, 2016 (14 pp).

Liu, X., et al., "FlowNet3D: Learning Scene Flow in 3D Point Clouds", https://arxiv.org/abs/1806.01411 Jul. 2019 (14 pp).

Qi, C.R., et al., "PointNet: Deep Learning on Point Sets for 3D Classification and Segmentation", https://arxiv.org/abs/1612.00593 v2, Apr. 2017 (19 pp).

Lee, J., et al., "Set Transformer: A Framework for Attention-based Permutation-Invariant Neural Networks", https://arxiv.org/abs/1810.00825 Jan. 2019 (10 pp).

Wikipedia, "Capsule neural network", Author Unknown, https://en.wikipedia.org/w/index.php?title=Capsule_neural_network, Downloaded Oct. 18, 2023 (7 pp).

\* cited by examiner

ENCODING THREE-DIMENSIONAL DATA FOR PROCESSING BY CAPSULE NEURAL NETWORKS

CROSS-REFERENCE TO RELATED APPLICATIONS

This application is a continuation of U.S. application Ser. No. 16/836,028 filed on Mar. 31, 2020, which claims the benefit of U.S. Provisional Application No. 62/904,890, filed on Sep. 24, 2019, the contents of which is incorporated herein in its entirety by reference for all purposes.

TECHNICAL FIELD

This disclosure relates to encoding three-dimensional data for processing by capsule neural networks.

BACKGROUND

A capsule neural network is a modification and expansion of convolutional neural network architectures that adds structures referred to as capsules. Capsule neural networks arrange capsules in a hierarchical manner to model relationships between groups of data. Each capsule is a group of hidden units. Each group represents a single feature and the hidden units jointly encode information about that feature. For example, the length of the hidden unit vector can be used to represent the existence of the feature and its direction could be used to represent the feature's instantiation parameters, such as pose. In contrast to unbundled hidden units, capsules can explicitly bind together all of the information regarding one entity in one place. When applied to computer vision models grouping in capsules makes it easy to enforce relationship rules, such as specifying that a particular part can only be a member of a single whole entity by enforcing the routing of the entire capsule to a single parent capsule. This combines the power of distributed representations (used within each capsule) with the interpretability of having one computational entity per real-world entity.

SUMMARY

One aspect of the disclosure is a method that includes defining a geometric capsule that is interpretable by a capsule neural network, wherein the geometric capsule includes a feature representation and a pose. The method also includes determining multiple viewpoints relative to the geometric capsule and determining a first appearance representation of the geometric capsule for each of the multiple viewpoints. The method also includes determining a transform for each of the multiple viewpoints that moves each of the multiple viewpoints to a respective transformed viewpoint and determining second appearance representations that each correspond to one of the transformed viewpoints. The method also includes combining the second appearance representations to define an agreed appearance representation. The method also includes updating the feature representation for the geometric capsule based on the agreed appearance representation.

Defining the geometric capsule may include receiving a group of elements that represent a three-dimensional scene as an input, identifying sampled elements from the group of elements, and assigning the sampled elements to the geometric capsule. Defining the geometric capsule may also include initializing the feature representation and the pose for the geometric capsule based on the sampled elements.

The group of elements may be a point cloud and the elements from the group of elements may be points that are included in the point cloud. The group of elements may be a group of lower-level geometric capsules.

Determining the transform for each of the multiple viewpoints may be performed using a trained neural network. The trained neural network may be configured to determine the transform for each of the multiple viewpoints such that the second appearance representations are constrained to match.

Another aspect of the disclosure is a non-transitory computer-readable storage device including program instructions executable by one or more processors that, when executed, cause the one or more processors to perform operations. The operations include defining a geometric capsule that is interpretable by a capsule neural network, wherein the geometric capsule includes a feature representation and a pose. The operations also include determining multiple viewpoints relative to the geometric capsule and determining a first appearance representation of the geometric capsule for each of the multiple viewpoints. The operations also include determining a transform for each of the multiple viewpoints that moves each of the multiple viewpoints to a respective transformed viewpoint and determining second appearance representations that each correspond to one of the transformed viewpoints. The operations also include combining the second appearance representations to define an agreed appearance representation and updating the feature representation for the geometric capsule based on the agreed appearance representation.

Another aspect of the disclosure is a system that includes a memory that includes program instruction and a processor that is operable to execute the program instructions, wherein the program instructions, when executed by the processor, cause the processor to define a geometric capsule that is interpretable by a capsule neural network, wherein the geometric capsule includes a feature representation and a pose. The instructions also cause the processor to determine multiple viewpoints relative to the geometric capsule and determine a first appearance representation of the geometric capsule for each of the multiple viewpoints. The instructions also cause the processor to determine a transform for each of the multiple viewpoints that moves each of the multiple viewpoints to a respective transformed viewpoint and determine second appearance representations that each correspond to one of the transformed viewpoints. The instructions also cause the processor to combine the second appearance representations to define an agreed appearance representation and update the feature representation for the geometric capsule based on the agreed appearance representation.

DETAILED DESCRIPTION

Figure 1:
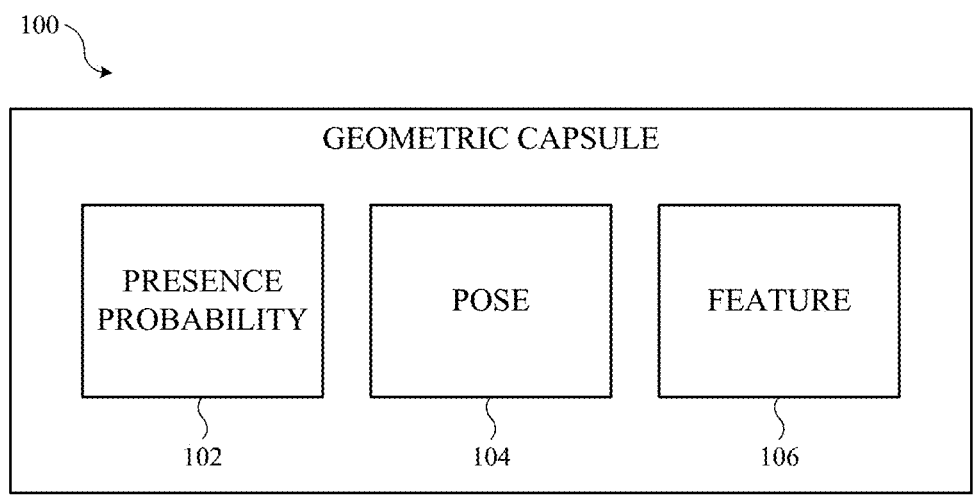
FIG. 1 is a block diagram that shows a geometric capsule.

The systems and methods that are described herein relate to encoding a three-dimensional point cloud into a form that can be processed by a capsule neural network. Object representations are learned from a three-dimensional point cloud using bundles of geometrically interpretable hidden units, which are referred to herein as geometric capsules. The geometric capsules each encode a geometric entity in terms of presence probability, pose, and feature. A complex object may be encoded hierarchically, by first encoding small surfaces into geometric capsules, and then encoding higher-level structures into higher-level geometric capsules that each include a group of lower-level geometric capsules.

The systems and methods that are described herein also relate to a voting method, referred to herein as multi-view agreement, that is used to route visual entities into capsules and define pose-invariant feature representations for the capsules. The systems and methods that are described herein also relate to autoencoders that use multi-view agreement to hierarchically encode a scene using a point cloud.

Prior capsule neural network systems typically represent the identity of a visual entity by place-coding, in which the identity of the visual entity corresponds to the index of the capsule. For example, the k-th capsule with a hidden state v encodes a variant of the k-th feature, k E [1, ... , k]. Therefore, only k types of features can be modeled, each with some flexibility. Moreover, at any multiple in an image (e.g., at different poses), this cannot be represented unless the model is applied repeatedly, similar to a convolution operation.

In some previous work on capsule neural networks, a capsule's presence probability was encoded as the length of the hidden unit vector corresponding to the capsule. The direction of the vector encodes the pose, and the index of the capsule encodes the feature. In order to model a complex data distribution with a discrete number of features, the pose of each capsule is able to model many variations. For higher-level features, this makes the pose very high dimensional and hard to interpret. In other prior work, a matrix is used to encode the pose of the entity with respect to the viewer and a separate binary unit is used to encode the existence of the capsule. Encoding the pose of visual entities explicitly as a coordinate transformation makes it possible for the network to encode the geometric relationship between a part and its parent object as a relative transform which is independent of the viewer's reference frame. This encoding inherently enforces viewpoint independence of the part-object geometric relationship. However, the feature is still represented by the index of the capsule in this encoding scheme. Prior work describing stacked capsule autoencoders modified this design by adding a feature vector to each capsule, but index of the capsule was still used to determine both the identity of the object and the decoder weights that govern its interactions with other capsules. Thus, the added feature vector captured some degrees of variation of the same feature, but the capsule identity was still place-coded.

Capsule networks are designed to allow the state of a parent capsule to be inferred, given the parts that belong to it. One prior approach is to have each part vote for the state of the parent by transforming its state by a learned weight matrix, which has been shown to work in the setting where discretely many parent objects are being considered for existence. In that case, each part casts a vote per object and the vote is conditioned on the index of the object. However, to represent generic objects that are value-coded instead of place-coded, a part cannot be relied on to vote for its parent object, because the same part can belong to many different objects. While each part does constrain the space of possible objects, the constraint cannot be reliably specified as a single vote or as a fixed number of votes.

Another prior approach processes all of the parts collectively into a set transformer that then outputs the parent's state. Since the model will have access to all the parts simultaneously, it can compute a feature representation for the object directly without any need for explicit voting or agreement among the parts. This approach can be implemented in an encoder that goes from part to object capsules. However, the feature representation is place-coded instead of value-coded and a separate decoder network per object index is needed for decoding.

FIG. 1 is a block diagram that shows a geometric capsule 100. The geometric capsule 100 is an encoded representation of a visual entity. As will be explained herein, the geometric capsules 100 explicitly encode the pose and features (e.g., shape) of the visual entity in a computer-interpretable form.

A visual entity is any type of entity that can be seen (e.g., by human eyes or by sensors such as cameras). A visual entity may be part of an object or all of an object. As examples, a visual entity may be a point-sample from a surface, a surface, a collection of surfaces, an object, or a scene that includes multiple objects. Geometric capsules may be arranged in a hierarchical manner, with higher-level geometric capsules defined as groups of lower-level geometric capsules.

As one example, the geometric capsule 100 may be an encoded representation of a group of points. As another example, the geometric capsule 100 may be an encoded representation of a surface that is defined based on a group of points. As another example, the geometric capsule 100 may be an encoded representation of a part of an object that is defined by multiple surfaces. As another example, the geometric capsule 100 may be an encoded representation of an object that is defined by multiple parts of the object. As another example, the geometric capsule 100 may be an encoded representation of a scene that is defined by multiple objects.

The geometric capsule 100 has a presence probability component 102, a pose component 104, and a feature component 106. The presence probability component 102, the pose component 104, and the feature component 106 are encoded hidden units that are included in the geometric capsule 100. As an example, the presence probability component 102, the pose component 104, and the feature component 106 may each be encoded as hidden unit vectors.

The presence probability component 102 describes the likelihood that the geometric capsule 100 exists. Since the geometric capsule 100 describes a visual entity, the presence probability component 102 therefore describes the likelihood that the visual entity represented by the geometric capsule 100 is present in a scene.

The pose component 104 describes where the visual entity represented by the geometric capsule 100 is. For example, the pose component 104 may describe the location and orientation of the object as an encoded set of values. As an example, the pose component 104 may be represented as a six degree-of-freedom coordinate transformation which encodes the canonical pose of that visual entity with respect to a viewer. The pose component 104 may be in the form of a transformation between a reference coordinate frame and the visual entity's canonical frame. The six degree-of-freedom coordinate transformation may be, for example, expressed as a translation and a quaternion (e.g., a four-element vector that encodes rotation in a three-dimensional coordinate system). As an example, the pose component 104 may be encoded such that the space of pose transformations is restricted to three-dimensional rotations and three-dimensional translations. The pose component 104 may exclude representation of other affine transformations such as scaling, shearing, and reflecting.

The feature component 106 describes what the visual entity represented by the geometric capsule 100 is. As an example, the feature component 106 may describe the geometric configuration of the visual entity represented by the geometric capsule 100 as an encoded set of values. The feature component 106 may be, for example, a real-valued vector. The feature component 106 may encode all non-pose attributes the visual entity that is represented by the geometric capsule 100, such as the shape of the visual entity.

The geometric capsule 100 may be represented in the form:

$$c = (c_p, c_q, c_f) \quad (1)$$

In Equation 1, $c_p$ represents the presence probability component 102 where $c_p \in [0,1]$. In Equation 1, $c_q$ represents the pose component 104, and includes a translation and rotation, e.g., each $c_q = (t, r)$ where $t \in \mathbb{R}^3$ is a translation and $r \in \mathbb{R}^4$, $\|r\|=1$, $r_0 \geq 0$ is a quaternion that represents rotation. Therefore $c_q$ may be a seven-dimensional vector that encodes where visual entity is with respect to a reference coordinate frame in six degrees of freedom. In Equation 1, $c_f$ represents the feature component 106, where $c_f \in \mathbb{R}^D$ represents the identity of the visual entity to define what the visual entity is and to encode all of the attributes of the visual entity other than its pose.

As will be explained herein, the geometric capsules 100 are used as the basis for defining a geometric capsule autoencoder model that learns to group low-level visual entities such as small local surfaces (parts) into high-level entities such as objects. A voting mechanism, referred to herein as multi-view agreement, facilitates value-coded capsule representations. The geometric capsule autoencoders are stacked to define successively higher-level representations, such as a point representation, a part representation, and an object representation. This configuration allows for understanding of object pose in a computer-interpretable manner, for use in tasks such as aligning entities such as point clouds, for use in tasks that require semantic understanding such as shape classification, and for use in other tasks that benefit from understanding and/or manipulating the poses of visual entities.

The systems and methods that are described herein include a voting mechanism for capsules, which is referred to as multi-view agreement. The systems and methods that are described herein include a capsule design, which is referred to as a geometric capsule. The systems and methods that are described herein use a variational autoencoder model that is configured to encode geometric capsules and use the geometric capsules to learn object representations. These models may be referred to as geometric capsule autoencoders.

The systems and methods herein are configured to encode and interpret three-dimensional input data. In the disclosure that follows, point cloud data is used as an example of three-dimensional input data. Using point cloud data, a visual scene may be represented as an unordered set of three-dimensional points. Point clouds encode locations of observed occupancy using three-dimensional coordinates. Thus, for example, each point in a point cloud may correspond to a location on the surface of a solid object. Because of this, analysis starts with geometrically meaningful entities.

Figure 2:
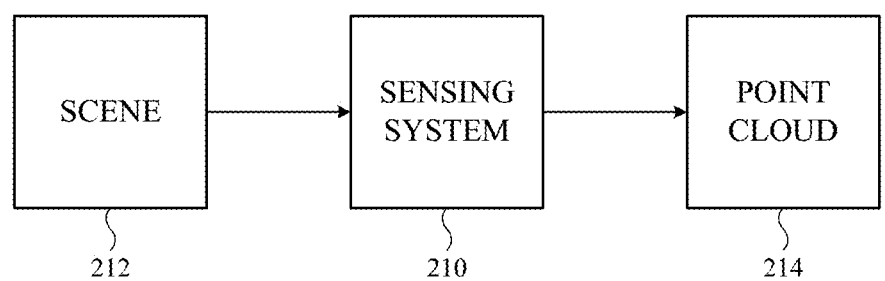
FIG. 2 is a block diagram that shows a sensing system.

FIG. 2 is an illustration that shows a sensing system 210. The sensing system 210 is configured to observe a scene 212 and to output a point cloud 214 that represents geometric features (e.g., point measurements of surface locations) of objects that are present in scene. The scene 212 may be any physical environment or simulated physical environment. The sensing system 210 is a sensor that is configured to observe the scene 212 and output information describing the scene, such as the point cloud 214. As examples, the sensing system 210 may be a three dimensional sensing device such as a depth camera (e.g., an RGB-D camera), a LIDAR sensor, a structured light sensor, an ultrasonic sensor, or any other type of sensing device operable to output information describing the geometric configurations of observed visual entities. The information collected by the sensing system 210 may be processed into the point cloud 214 or other computer-interpretable data representation of the scene 212.

As will be described in detail, three-dimensional input data, such as the point cloud 214, can be processed to define a hierarchical representation of the scene 212. The hierarchical representation of the scene 212 can be defined by grouping points from the point cloud 214 into parts, and then grouping parts into objects. Each of the parts and each of objects are represented by a geometric capsule, per the description of the geometric capsule 100. The hierarchical representation of the object is determined by dynamically routing points from the point cloud 214 to geometric capsules that each represent a part (herein, "part capsules") and by routing the part capsules to geometric capsules that each represent an object (herein, "object capsules"). In the description herein, routing is performed using a process referred to as multi-view agreement to determine the part capsules and to determine the object capsules.

Figure 3:
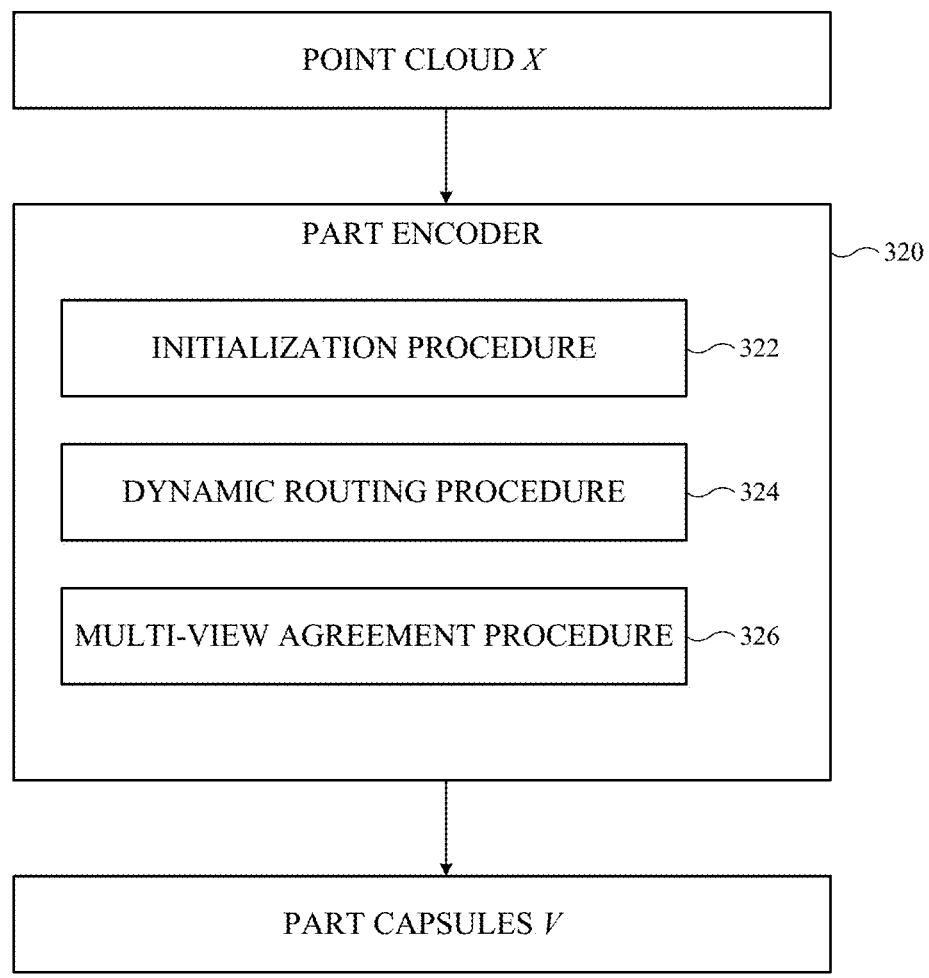
FIG. 3 is a block diagram that shows a part encoder.

FIG. 3 is an illustration that shows a part encoder 320. The part encoder 320 is implemented in the form of a variational autoencoder and may also be referred to as a points-to-parts autoencoder. The part encoder 320 is configured to encode a part in the form of capsules that describe geometry of parts of an object and can be processed by a capsule neural network. These capsules are referred to herein as geometric part capsules or part capsules.

The part encoder 320 is configured to process three-dimensional input data, which in the illustrated example is a point cloud X, and to output part capsules V. The point cloud the point cloud X is equivalent to the point cloud 214. The part capsules V encode a portion of an object (e.g., a part of a surface), and are consistent with the description of the geometric capsule 100. To process the point cloud X, the part encoder 320 includes an initialization procedure 322, a dynamic routing procedure 324, and a feature update procedure 326.

The initialization procedure 322 defines the part capsules V and sets initial values for each of the part capsules V including initial values for the pose component and feature component for each of the part capsules. The dynamic routing procedure 324 assigns points from the point cloud X to specific ones of the part capsules V. The feature update procedure 326 updates the feature component for each of the part capsules V. The dynamic routing procedure 324 and the feature update procedure 326 are implemented using one or more capsule neural networks that are configured to accept the part capsules V as an input.

In an example of an implementation of the part encoder 320, the point cloud X and the part capsules V are defined as follows:

$$X = \{x^i\}_{i=1}^{N} \quad (2)$$

$$V = \{v_q^j, v_f^j\}_{j=1}^{M} \quad (3)$$

In Equation 2, $x^i \in \mathbb{R}^3$ represents a three-dimensional point. In Equation 3, $v_q^j$ represents the pose for the $j^{th}$ capsule and $v_f^i$ represents the feature for the $j^{th}$ capsule. The number N represents the total number of points in the point cloud X, which is larger than the number M, which represents the total number of the part capsules V. Multiple points from the point cloud X are used to define each of the part capsules V, as will be explained herein.

Since the point cloud X is sampled from the surface of objects, it can be treated as a collection of two-dimensional surfaces embedded in a three-dimensional space. The feature component $v_f^j$ for each of the part capsules V may therefore include an encoded representation of a surface. The feature component $v_f^j$ may be encoded based on the points included in a part capsule V using a trained encoding model, such as a neural network, that is trained to encode a surface in a form that can be subsequently decoded by a corresponding decoder model.

One example of a prior art encoding and decoding scheme that can be used to encode the feature component $v_f^j$ for each of the part capsules V is know as a FoldingNet. In this approach, a surface is represented using a feature vector $v_f \in \mathbb{R}^D$ that describes how a two-dimensional unit square can be folded into that surface. The surface represented by any feature f can be decoded using a neural network $G_\theta:(\mathbb{R}^D \times \mathbb{R}^2) \to \mathbb{R}^3$ that maps the feature components $v_f^j$ concatenated with two-dimensional points sampled from a unit square to three-dimensional points.

The pose component $v_q^j$ for each of the part capsules V is determined such that it can be applied to transform the generated three-dimensional surface to the viewer's reference frame. Thus, each part capsule V may define a three-dimensional surface that is a constituent part of a larger three-dimensional surface. Determination of the pose component $v_q^j$ will be described further herein.

To infer the part capsules V given the point cloud X, the pose component $v_q^j$ is initialized for each of the part capsules V as part of the initialization procedure 322. Points are sampled from the point cloud X in a number that is equal to the number M of the part capsules V and each of the sampled points is assigned to one of the part capsules V. The points may be sampled from the point cloud X in a manner that enforces spacing between the sampled points and samples points from various locations through the point cloud X such that the sampled points are spatially-representative of the geometric configuration of the point cloud X. As an example, the points may be sampled from the point cloud X using greedy farthest point sampling. The translation values of the pose components $v_q^j$ of the part capsules V are set to the translation values of sampled points such that locations of the part capsules V correspond to the locations on the points that are sampled during the initialization procedure 322. The rotation values for each pose component $v_q^j$ are set to be random. Additionally, variational parameters $(\mu^j, \sigma^j)$ are defined to be the mean and standard deviation for a Gaussian distribution corresponding to the feature vector $v_f^j$. The variational parameters are initialized to 0 and 1 respectively. The feature component $v_f^j$ is therefore initialized to represent a small surface of limited extents to represent the sampled point, and is located and oriented according to the pose component $v_f^j$.

After the feature component $v_f^j$ and the pose component $v_q^j$ are initialized for each of the part capsules V during the initialization procedure 322, the dynamic routing procedure 324 and the feature update procedure 326 are performed iteratively. The dynamic routing procedure 324 updates the assignment of points from the point cloud X to the part capsules V. The feature update procedure 326 updates the feature component $v_f^j$ and the pose component $v_q^j$ for each of the part capsules V based on the points that are currently assigned to each of the part capsules V to reflect the fact that one or more additional points may have been assigned to each of the part capsules V by the dynamic routing procedure 324.

In each iteration of the dynamic routing procedure 324, points from the point cloud X are assigned to the part capsules V. Each part feature $v_f^j$ is sampled from a Gaussian distribution $\mathcal{N}(\mu^j, \sigma_j)$ as in Equation 4. Each part capsule is then decoded using the neural network $G_\theta$ and a uniformly sampled unit square grid U to obtain a folded surface $Y^j$ as in Equation 5.

$$v_f^j = \mu^j + \sigma^j * \epsilon, \; \epsilon \sim \mathcal{N}(0, 1) \quad (4)$$

$$Y^j\big|_{v_q^j} = \{y \mid y = G_\theta(v_f^j, u_x, u_y), (u_x, u_y) \in U\} \quad (5)$$

The generated surface is in the canonical pose of the part that is represented by the part capsule V. The generated surface is transformed from the canonical pose of the part to the viewer's frame by applying the transformation $v_q^j$ as in Equation 6.

$$Y^j = \left\{v_q^j \odot y \,\big|\, y \in Y^j\big|_{v_q^j}\right\} \quad (6)$$

In Equation 6, the symbol $\odot$ denotes the application of a transform to a point. A point $x^i$ should belong to part $v^j$ if it is well-explained by its generated surface $Y^j$. For example, the point $x^i$ may be determined to correspond to the part $v^j$ if a distance between the point $x^i$ and the surface $Y^j$ is less than a threshold value, such that the distance between the point $x^i$ and the surface $Y^j$ is low. The threshold value may be determined dynamically. As one example, the threshold distance may be determined dynamically based on distances between part capsules. As another example, the threshold distance may be determined dynamically based on spatial characteristics of the point cloud (e.g., size and density).

The distance between the point $x^i$ and the surface $Y^j$ may be computed approximately by finding the distance to the closest point in the surface $Y^j$, according to Equation 7.

$$d_{ij} + \min_{y \in Y^j} \|x^i - y\|^2 \quad (7)$$

The squared distances are accumulated over iterations and used to compute the routing probabilities, as shown in Equations 8-9, in which $\lambda$ is a tuning parameter that sets the scale for distances.

$$e_{ij} \mathrel{+}= d_{ij} \qquad (8)$$

$$R_{ij} = \frac{\exp(-\lambda e_{ij})}{\sum_{j'=1}^{J} \exp(-\lambda e_{ij'})} \qquad (9)$$

After the assignment of points from the point cloud X to the part capsules V, part representations are inferred using the feature update procedure 326.

The feature representation is value-coded for each of the part capsules V by the geometric capsule networks included in the feature update procedure 326. For example, a feature $v \in \mathbb{R}^D$ is referenced in a certain pose with respect to the viewer. The result is a permutation invariant set of capsules. The weights governing interaction of a capsule from the part capsules V with the rest of the network do not depend on the index of the capsule. Multiple instances of the same feature can be represented and may make use of the continuous value-coded representation space to learn a metric over features (e.g., similar features can be closer together than dissimilar ones), which cannot be done using place-coded features.

In the feature update procedure 326, the value-coded representation of a parent object, here each of the part capsules V, is discovered using auxiliary viewpoints. Two components are determined for each capsule: the canonical pose for the object with respect to the viewer and a pose-invariant feature vector. If the object is observed from multiple random viewpoints, the appearance of the object, is likely to be different from the viewpoints. Herein, the term percept is defined as the appearance of an object from a viewpoint. This may also be described as an appearance representation. The percept or appearance representation may be represented in any suitable form, such as a data-based form configured for processing by a deep-neural network (or other system) or in a form that can be readily output for display to a human user, such as an image. The percept from an arbitrary viewpoint may be determined by graphical rendering techniques or may be determined using a trained machine learning model, such as a deep neural network.

The feature update procedure 326 includes a deep neural network, or other trained machine learning model, that is trained to accept the percept from an arbitrary viewpoint as and input and output a transformation, that when applied to that viewpoint, moves the view point to the canonical frame of the object. This can be done by applying a constraint that causes the percept of the object from the transformed viewpoints to be the same. In other words, the multiple random viewpoints initially disagree on the percept but are constrained to agree on the percept after being transformed by the neural network's output on their respective initial percepts. This allows determination of the two components of the capsule representation. The canonical pose of the object with respect to the viewer is determined by composing the transformation between the viewer and any random viewpoint, with the transformation from that viewpoint to the canonical pose. The agreed-upon percept gives the pose invariant feature. The percepts from the transformed viewpoints are constrained to agree, but the transformed viewpoints do not agree. This mitigates issues arising from objects having symmetries which make it impossible to have a unique canonical pose.

In the feature update procedure 326, each capsule's pose $v_q^j$ and the variational parameters for its feature ($\mu^j$, $\sigma^j$) can be estimated using the routing probabilities $R_{ij}$.

K random viewpoints are sampled around the current estimate for $v_q^j$. Any point $x^i$ observed from a random viewpoint z looks like $x^i|z = z^{-1} \odot x^i$ Each point is then fed into an embedding network f embed. The outputs are weighted by the routing probabilities and max-pooled. The result is then fed into a projection network that outputs a transformation according to Equations 10 and 11.

$$z \sim \mathrm{perturb}(v_q^j) \qquad (10)$$

$$\Delta z = f_{project}(\mathrm{maxpool}_i R_{ij} f_{embed}(x^i|z)) \qquad (11)$$

In Equation 11, $f_{embed}$ and $f_{project}$ are both deep neural networks. The deep neural networks $f_{embed}$ and $f_{project}$ can be implemented using the prior art network architecture known as PointNet, which can be used to obtain a permutation-invariant representation of a set of points. This output transformation is then applied to the viewpoint to obtain a candidate canonical pose, as shown in Equation 12.

$$v^q|_z = z \circ \Delta z \qquad (12)$$

The percept from this candidate canonical pose is then computed by similarly applying a network implemented according to PointNet on the input point set as viewed from the candidate canonical pose. Since the percept is modeled as a Gaussian random variable, its distribution parameters are computed as shown in Equation 13.

$$\mu^j|z, \sigma^j|_z = g_{project}(\mathrm{maxpool}_i R_{ij} g_{embed}(x^i|z \circ \Delta z)) \qquad (13)$$

In the feature update procedure 326, each percept is a vote for what the object is. The votes from different viewpoints are combined by taking a product of the Gaussian distributions as shown in Equation 14.

$$\mathcal{N}(\mu^j, \sigma^j) = \Pi_{z \in Z} \mathcal{N}(\mu^j|_z, \sigma^j|_z) \qquad (14)$$

In Equation 14, Z represents the set of all K random viewpoints. The parameters of the resulting Gaussian distribution are the updated variational parameters for the feature representation of the part capsules V.

The dynamic routing procedure 324 and the feature update procedure 326 are similar to the E-step and M-step, respectively, of an expectation maximization inference algorithm. In example implementations, the routing probabilities of the three iterations usually showed convergence of the routing probabilities. For training the neural networks used in the part encoder 320, multiple iterations of the dynamic routing procedure 324 and the feature update procedure 326 are performed and a union of the reconstructed surfaces $Y = U_j Y^j$ from the last iteration were used as the reconstruction of the input point cloud. The Chamfer distance between the reconstructed point cloud Y and the input cloud X may be computed according to Equation 15.

$$d(X, Y) = \frac{1}{|Y|} \sum_{y \in Y} \min_{x \in X} \|x - y\|^2 + \frac{1}{|X|} \sum_{x \in X} \min_{y \in Y} \|x - y\|^2 \qquad (15)$$

The neural networks or the part encoder 320 are trained using backprogation to minimize this distance, along with the regularization terms coming from the variational autoencoder.

The techniques described for defining the part capsules V from the points X using the part encoder 320 can be extended to define object capsules from part capsules using a variational autoencoder model for modeling the part capsules using object capsules.

Figure 4:
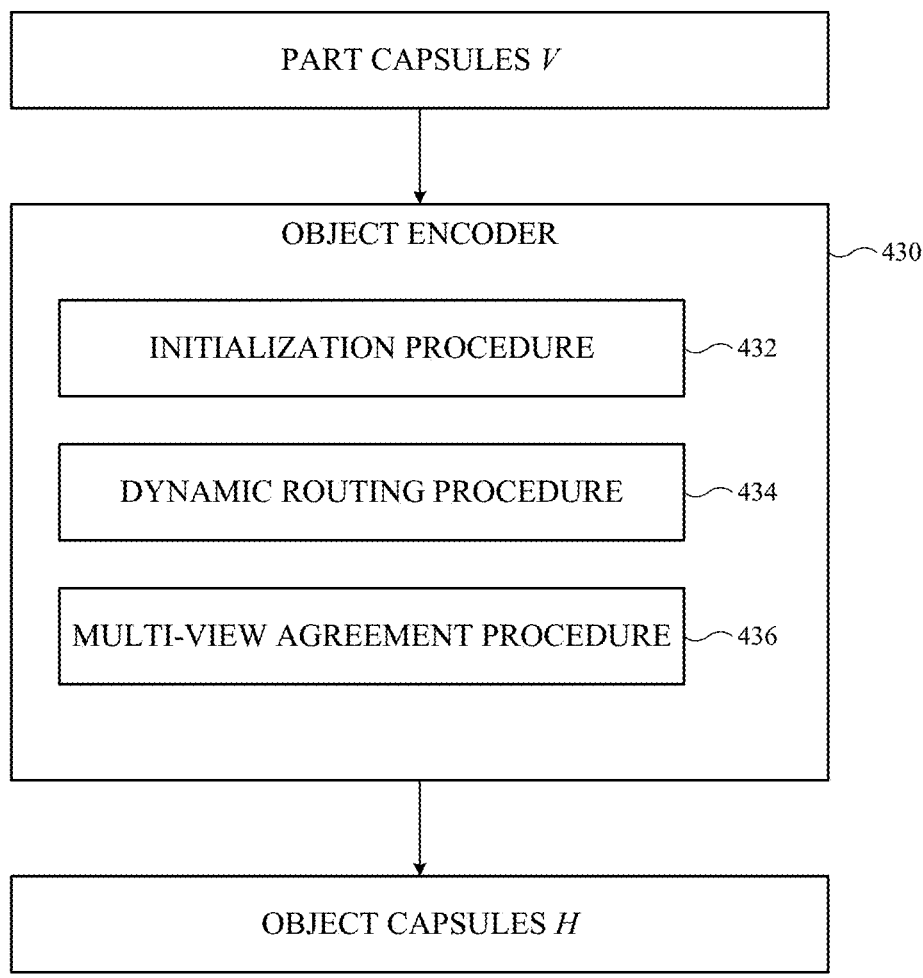
FIG. 4 is a block diagram that shows an object encoder.

FIG. 4 is a block diagram that shows an object encoder 430. The object encoder 430 is implemented in the form of a variational autoencoder and may also be referred to as a parts-to-objects autoencoder. The object encoder 430 is configured to encode objects in the form of capsules that describe geometry of the objects and can be processed by a capsule neural network. These capsules are referred to herein as geometric object capsules or object capsules.

The object encoder 430 receives the part capsules V as an input and determines object capsules H as an output. The object encoder 430 includes an initialization procedure 432, a dynamic routing procedure 434, and a feature update procedure 436.

The part capsules V are a set of set of N part capsules and the object capsules H are a set of M objects, as described by Equations 16 and 17.

$$V = \{(v_q^i, v_f^i)\}_{i=1}^N \quad (16)$$

$$H = \{(h_q^j, h_f^j)\}_{j=1}^M \quad (17)$$

In Equation 17, the object capsules H are defined as include a pose component $h_q^j$ and a feature component $h_f^j$. A routing probability $R_{ij} \in [0,1]$ represents the probability of routing part $i$ to object to j, $E_j R_{ij}=1$.

In order to infer the object capsules H given the part capsules V, object features including the pose component $h_q^j$, and the feature component $h_f^j$ are first initialized. The initialization procedure 432 is the same as the initialization procedure 322 of the part encoder 320, except that the translation components of the pose of each part capsule is used for greedy farthest point sampling. Variational parameters ($\mu^j$, $\sigma^j$) are set to be the mean and standard deviation for a Gaussian distribution corresponding to the feature vector $h_f^j$.

After the initialization procedure 432 is completed, the dynamic routing procedure 434 and the feature update procedure 436 are performed iteratively. The dynamic routing procedure 434 updates the assignment of the part capsules V to the object capsules H. The feature update procedure 436 updates the representation of each object given the parts that are assigned to it.

Next, parts are assigned to objects. Each object feature $h_f^j$ is sampled from a Gaussian distribution $\mathcal{N}(\mu^j, \sigma^j)$ as in Equation 18.

$$h_f^j = \mu^j + \sigma^j * \epsilon, \epsilon \sim \mathcal{N}(0, 1) \quad (18)$$

The next step is to decode the feature to output the part capsules. The design of the decoder differs from that used in the part encoder 320 where the example implementation using the FoldingNet model relied on the fact that a deformed surface and a unit square share the same topology. Instead, to avoid describing objects in terms of deformations of a particular geometric topology, the object encoder 430 includes a decoder network $G_\theta$ directly outputs a predetermined number of part capsules as described in Equation 19.

$$\left(u_q^n|_{h_q^j}, u_f^n\right)_{n=1}^N = G_\theta(h_f^j) \quad (19)$$

Where $$u_q^n|_{h_q^j}$$

is is the pose of the part in the object's canonical frame, and $u_f^n$ is the feature of the part. The part's pose is then composed with the object's pose $h_q^j$ to obtain the part's pose in the viewer's reference frame as in Equation 20.

$$u_q^n = h_q^j \circ u_q^n|_{h_q^j} \quad (20)$$

The poses, along with the features $u_f^n$ defines the set of part capsules $U^j$ decoded from object $h^j$ per Equation 21.

$$U^j = \{(u_q^n, u_f^n)\}_{n=1}^N \quad (21)$$

In order for a part $v^i$ to be routed to object $h^i$, it must be explained by that object. For example, there must be some element of $U^i$ that is close to $v^i$. This can be measured by finding the smallest distance between $v^i$ and elements of $U^i$ as in Equation 22.

$$d_{ij} = \min_{u \in U^j} d_{caps}(v^i, u) \quad (22)$$

In Equation 22, $d_{caps}$ is a distance metric defined over capsules. The distance between two capsules is defined to be the sum of the distances between the translation, rotation and feature terms, as described in Equation 23, in which $v_q[t]$, $v_q[r]$ represent the translation and rotation components of the pose.

$$d_{caps}(v, u) = \|v_q[t] - u_q[t]\|^2 + 1 - (\langle v_q[r], u_q[r] \rangle)^2 + \|v_f - u_f\|^2 \quad (23)$$

Note that the similarity between quaternions is computed as the square of their dot products, which corresponds to the negative likelihood from a Bingham distribution. This accounts for the fact that quaternions have antipodal symmetry (r and −r represent the same rotation). The distance $d_{ij}$ between the $v^i$ and $U^j$ is used to update the routing probabilities $R_{ij}$ in the same way as done in the points-to-parts model of the part encoder 320.

Next, in the feature update procedure 436, object representations are inferred. Again, multi-view agreement is used to estimate each object's pose $h_q^j$ and the variational parameters for its feature ($\mu^j$, $\sigma^j$). The procedure is the same as that used for the points to parts model of the part encoder 320. The embedding networks in this case take as input the view of a part from a random viewpoint z, $v^i|_z = (z^{-1} \cdot v_q^i, v_f^i)$. The relative pose and feature components are concatenated and fed into the embedding networks. The procedure can be summarized as in Equations 24-28.

$$z = perturb(h_q^j) \quad (24)$$

$$\Delta z = f_{project}(maxpool_i R_{ij} f_{embed}(v^i|_z)) \quad (25)$$

$$h_q^z = z^j \circ \Delta z \quad (26)$$

$$\mu^j|_z, \sigma^j|_z = g_{project}(maxpool_i R_{ij} g_{embed}(v^i|_{z \circ \Delta z})) \quad (27)$$

$$\mathcal{N}(\mu^j, \sigma^j) = \prod_{z \in Z} \mathcal{N}(\mu^j|_z, \sigma^j|_z) \quad (28)$$

The dynamic routing procedure 434 and the feature update procedure 436 are run iteratively to update the routing probabilities and the representations of the objects.

Example implementations typically obtained convergence within three iterations of the dynamic routing procedure 434 and the feature update procedure 436. Training is implemented as described with respect to the points to parts model with the chamfer distance modified to use the distance metric defined over capsules $d_{caps}$ as opposed to the squared Euclidean distance between points because capsules are being reconstructed instead of points.

The part encoder 320 and the object encoder 430 can be combined into a points to objects encoder in which the part encoder 320 and the object encoder 430 are stacked in an end-to-end manner that coverts a point cloud into part capsules and then converts the part capsules into object capsules.

The object capsules H are an encoded form of the object represented by the point cloud or other three-dimensional input data. The object capsules H are interpretable by a capsule neural network. The object capsules H are can be used to implement capsule neural networks that analyze three-dimensional objects. As one example, the object capsules H can be used to encode representations of three-dimensional objects for use by a three-dimensional object classifier that is implemented using a capsule neural network. As another example, the object capsules H can be used to encode representations of three-dimensional objects for use by a system that is implemented using a capsule neural network and utilizes the pose (e.g., including translation and rotation) of an object as an input. As another example, the object capsules H can be used to encode a representation of a three-dimensional scene that includes multiple parts for use by a system that is implemented using a capsule neural network and is configured to analyze the contents of a scene.

In one implementation, the object capsules H may be used in the context of a computer-generated reality device, such as a virtual reality device or an augmented reality device. A three-dimensional sensor that is included in the device obtains three-dimensional data, such as a point cloud, that represents the physical environment around the device. The three-dimensional data is interpreted as described herein, and encoded as object capsules H that each represent a portion of the physical environment and, together, define a scene that represents the physical environment. The object capsules H may be analyzed using a capsule neural network to understand characteristics of the physical entities that the object capsules H represent, such as by assigning an object classification to each of the object capsules H. The object capsule representation of the physical environment may then be used to allow interaction with the physical environment (or a virtual representation of it) in a computer-generated reality scene. As one example, the position, pose, and object classification (or other characteristics) for each of the object capsules H may be used to place virtual objects in a computer-generated reality scene at particular positions and poses relative the physical objects that are represented by the object capsules H. As one example, the position, pose, and object classification (or other characteristics) for each of the object capsules may be used to place virtual objects in a computer-generated reality scene and allow the user to interact with virtual representations of the physical objects, for instance, by allowing a user to rearrange virtual furniture in a computer-generated reality scene, where the virtual furniture items correspond to object capsules determined by scanning the physical environment around the user.

In another implementation, the object capsules H may be used in the context of a system that relies on real-time scene understanding, such as a mobile robot. A three-dimensional sensor that is included in the mobile robot obtains three-dimensional data, such as a point cloud, that represents the physical environment around the mobile robot. This data is obtained on an ongoing basis at each of multiple time steps. The three-dimensional data from each time steps interpreted as described herein, and encoded as object capsules H that each represent a portion of the physical environment and, together, define a scene that represents the physical environment. The representations of the scene from various time steps can be processed by a capsule neural network to align the representations (e.g., when the mobile robot is moving) and to identify and track moving objects that are present in the scene.

Figure 5:
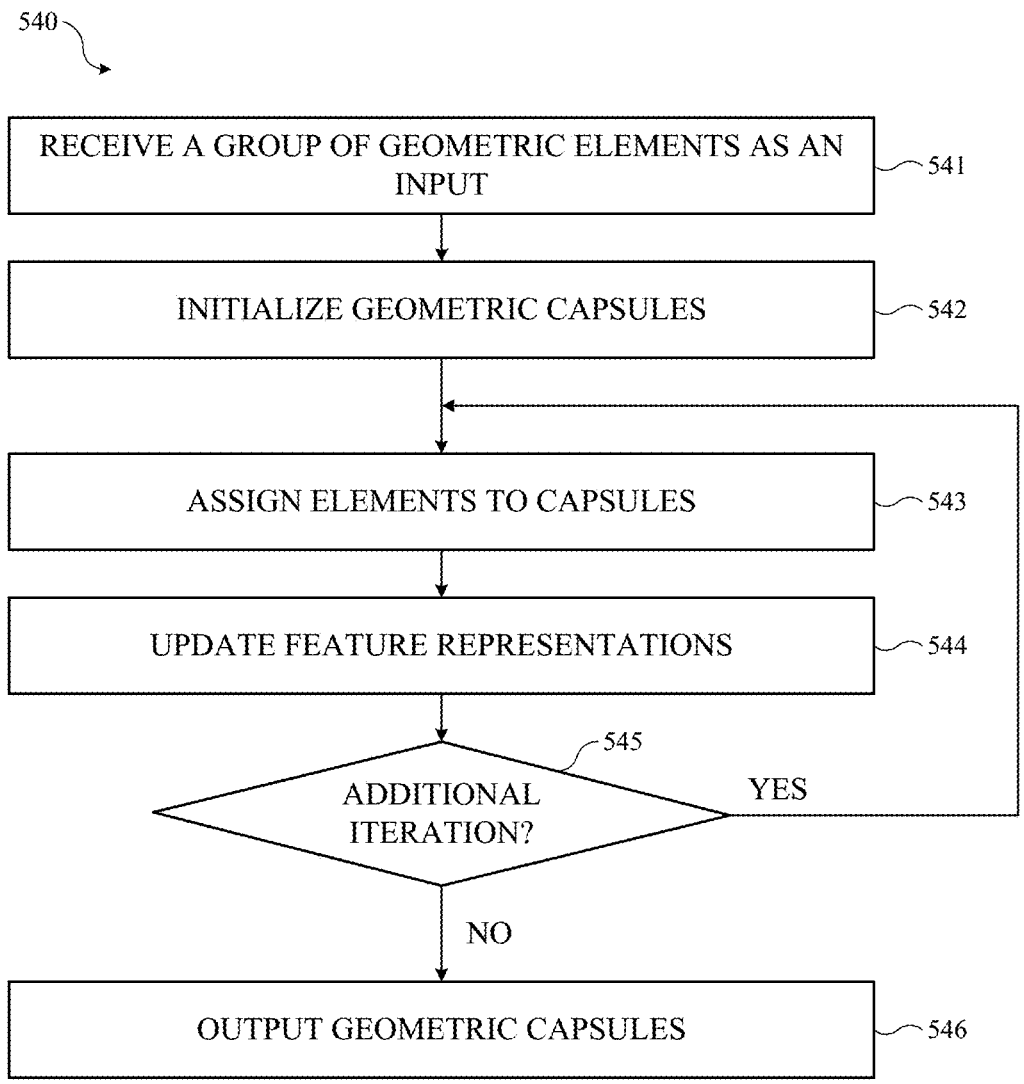
FIG. 5 is a flowchart that shows an example of a process for encoding a geometric capsule.

FIG. 5 is a flowchart that shows an example of a process 540 for encoding one or more geometric capsules. The process 540 may be implemented in accordance with the description of the part encoder 320 and the object encoder 430. The description of the part encoder 320 and the object encoder 430 along with their various inputs, outputs, and components is incorporated by reference in the description of the process 540.

The process 540 may be implemented using a computing device. As one example, a computing device may include one or more processors, one or more memory devices, and computer-interpretable instructions that are stored in the one or more memory device and accessible to the one or more processors, wherein the instructions, when executed by the one or more processors, cause the one or more processors to perform the operations of the process 540. In some implementations, the process 540 is implemented in the form of a non-transitory computer-readable storage medium that includes computer-interpretable program instructions that cause operation of the process 540 by one or more processors when executed.

In operation 541, a group of geometric elements is received as an input. As one example, the group of geometric elements may be a point cloud, such as the point cloud 214 or the point cloud X described with respect to the part encoder 320. As another example, the group of geometric elements may be a group of geometric capsules that are of a lower-level than the geometric capsules that will be defined in the process 540. As an example, the group of geometric capsules that is received as an input may be the part capsules V, as described with respect to the part encoder 320, and the geometric capsules that are defined in the process 540 as an output may be the object capsules H, as described with respect to the object encoder 430.

In operation 542, one or more geometric capsules are initialized. The geometric capsules that are initialized in operation 542 may be consistent with the geometric capsule 100, as previously described. Initialization of the geometric capsules in operation 542 may be performed in the manner described with respect to the initialization procedure 322 of the part encoder 320, or in the manner described with respect to the initialization procedure 432 of the object encoder 430.

As an example, initializing the one or more geometric capsules in operation 542 may include sampling a number of the geometric elements that is equal to the number of geometric capsules that are being initialized. Sampling may be performed in a manner that collects spatially distributed elements from the group of geometric elements (e.g., a point cloud). One example of sampling that collects spatially distributed elements is greedy furthest point sampling. Other sampling methods may be used. Each of the sampled elements is assigned to one of the geometric capsules. The translation values of the pose for each geometric capsule are set equal to the translation values for the geometric element that is assigned to it during initialization in operation 542. The rotation values of the pose for each geometric capsule may be set to random values or default values during initialization in operation 542 since a meaningful rotation value cannot be set for the geometric capsules based on a single constituent geometric element.

Operation 543 and operation 544 are performed in an iterative manner after initialization of the geometric capsules in operation 542 to determine the pose and feature representation for each of the geometric capsules based on the geometric elements that were received as inputs in operation 541.

In operation 543, geometric elements are assigned to the one or more geometric capsules. Operation 543 may be performed in the manner described with respect to the dynamic routing procedure 324 of the part encoder 320 or in the manner described with respect to the dynamic routing procedure 434 of the object encoder 430. As an example, the geometric elements may be assigned to geometric capsules based on distances between the geometric elements and the geometric capsules and/or features described by the feature representations of the geometric capsules.

In operation 544, the feature representations are updated for the one or more capsules. The feature representations are updated in a manner that results in a pose-invariant feature representation for each of the one or more geometric capsules. As an example, the feature representations may be updated by determining a canonical pose for each of the one or more capsules, determining appearance representations that describe the appearance of each of the one or more capsules from the canonical pose, and updating the feature representations based on the respective appearance representations. Operation 544 may be performed, for example, as described with respect to the feature update procedure 326 of the part encoder 320, as described with respect to the feature update procedure 436 of the object encoder 430, and/or in accordance with the description of multi-view agreement.

In operation 545 a decision is made as to whether additional iterations of operation 543 and operation 544 will be performed. Thus, operation 545 may include determining whether an additional iteration of operation 543 and operation 544 will be performed. As one example, an additional iteration may be performed if any of the geometric elements that were received as inputs in operation 541 have not been assigned to a geometric capsule. As another example, an additional iteration may be performed in routing probabilities associated with any of the geometric elements are below a threshold value.

If an additional iteration of operation 543 and operation 544 will be performed, the process returns to operation 543. If additional iterations of operation 543 and operation 544 will not be performed the process proceeds to operation 546. In operation 546, the geometric capsules are output for processing, interpretation, and/or use by a capsule neural network.

Figure 6:
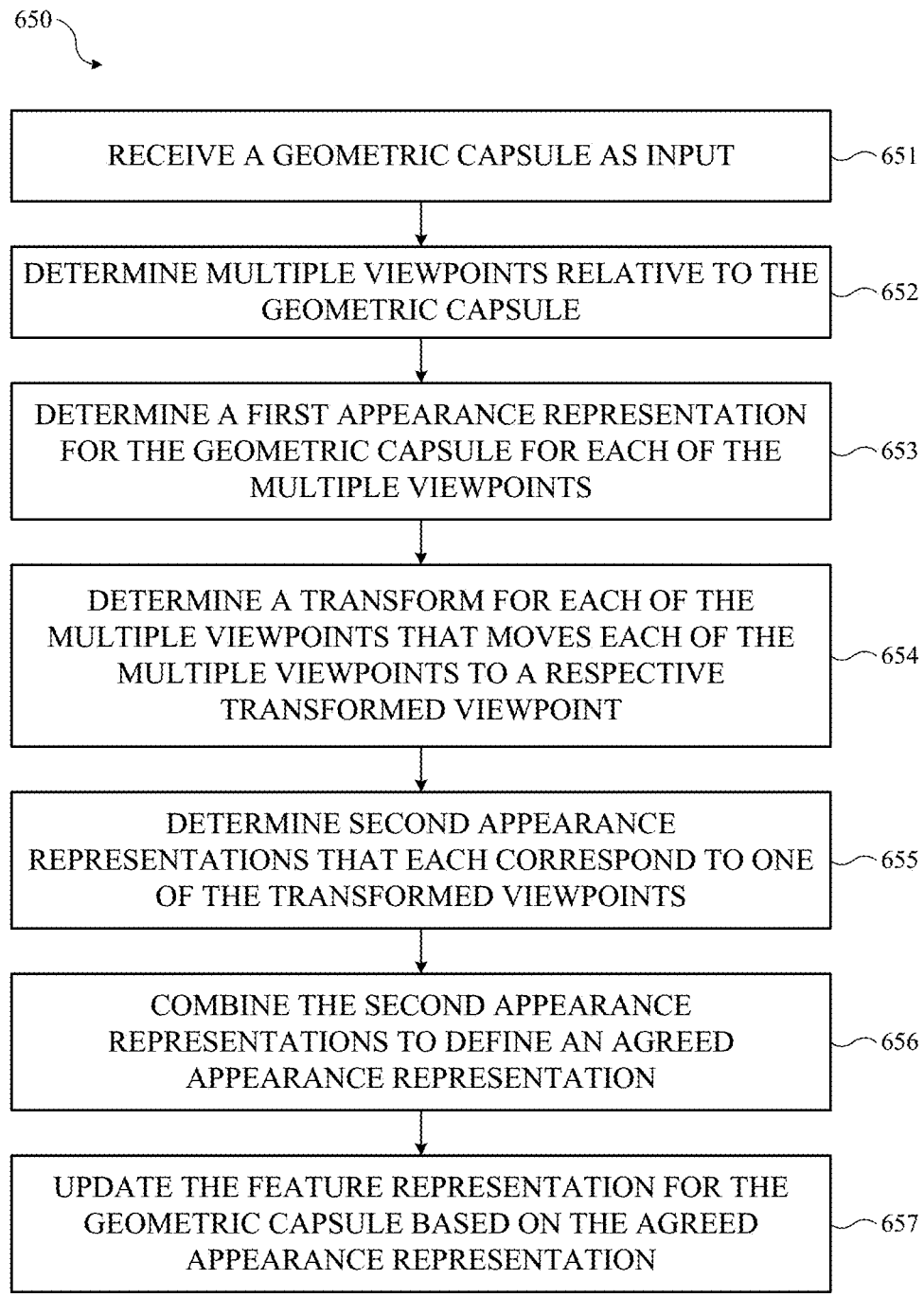
FIG. 6 is a flowchart that shows an example of a process for updating a feature representation of a geometric capsule using multi-view agreement.

FIG. 6 is a flowchart that shows an example of a process 650 for updating a feature representation of a geometric capsule using multi-view agreement. The process 650 may be implemented in accordance with the description of the part encoder 320 and the object encoder 430. The description of the part encoder 320 and the object encoder 430 along with their various inputs, outputs, and components is incorporated by reference in the description of the process 650.

The process 650 may be implemented using a computing device. As one example, a computing device may include one or more processors, one or more memory devices, and computer-interpretable instructions that are stored in the one or more memory device and accessible to the one or more processors, wherein the instructions, when executed by the one or more processors, cause the one or more processors to perform the operations of the process 650. In some implementations, the process 650 is implemented in the form of a non-transitory computer-readable storage medium that includes computer-interpretable program instructions that cause operation of the process 650 by one or more processors when executed.

Operation 651 includes receiving a geometric capsule as an input. The geometric capsule that is received as an input in operation 651 can be defined in the manner described with respect to the process 540 with respect to initializing geometric capsules based on input data that describes geometric elements such as a point cloud or such as lower-level geometric capsules. As one example, the geometric capsule that is received as an input in operation 651 may represent a group of one or points from a point cloud. As another example, the geometric capsule that is received as an input in operation 651 may represent a group of one or more geometric capsules. For example, a geometric capsule that represents a three-dimensional object may represent a group of one or more geometric part capsules. Those geometric part capsules may each represent a group of one or more points from a point cloud. Thus, the geometric capsules may describe objects in a hierarchical manner in which higher-level geometric capsules each represent one or more lower-level geometric elements.

As an example, the geometric capsule that is received in operation 651 can be defined by receiving a group of elements that represent a three-dimensional scene as an input, identifying sampled elements from the group of elements, and assigning the sampled elements to the geometric capsule. As another example, the geometric capsule that is received in operation 651 can be defined by initializing the feature representation and the pose for the geometric capsule based on the sampled elements. The group of elements used to define the geometric capsule may be a point cloud and the elements from the group of elements may be points that are included in the point cloud. The group of elements may be a group of lower-level geometric capsules.

Determining the transform for each of the multiple viewpoints may be performed using a trained neural network. The trained neural network may be configured to determine the transform for each of the multiple viewpoints such that the second appearance representations are constrained to match.

Operation 652 includes determining multiple viewpoints relative to the geometric capsule. As an example, multiple viewpoints may be randomly selected. Operation 653 includes determining a first appearance representation of the geometric capsule for each of the multiple viewpoints. The first appearance representation for each of the viewpoints is a description of the appearance of the geometric capsule taken from the location described by the viewpoint.

The first appearance representations each describe the appearance of the geometric capsule from one of the random viewpoints. The first appearance representation may be represented in any suitable form, such as a data-based form configured for processing by a deep-neural network (or other system) or in a form that can be readily output for display to a human user, such as an image. As one example, the first appearance representation may be described by the distribution parameters of a Gaussian random variable.

Operation 654 includes determining a transform for each of the multiple viewpoints that moves each of the multiple viewpoints to a respective transformed viewpoint. Operation 654 may be performed using a trained neural network, as a previously described. The transformed viewpoint may also be referred to herein as a canonical viewpoint or a canonical pose.

Operation 655 includes determining second appearance representations that each correspond to one of the transformed viewpoints. The second appearance representations each describe the appearance of the geometric capsule from one of the transformed viewpoints. The second appearance representation may be represented in any suitable form, such as a data-based form configured for processing by a deep-neural network (or other system) or in a form that can be readily output for display to a human user, such as an image. As one example, the second appearance representation may be described by the distribution parameters of a Gaussian random variable.

The transformed viewpoints determined in operation 654 are intended to result in second appearance representations that agree (e.g., the appearance of the geometric capsule is similar for all of the transformed viewpoints). The second appearance representations are votes for describing what the geometric capsule is, which results in a pose-invariant representation given that the appearance from any random viewpoint is used to define a transformation that moves the viewpoint to one at which the resulting appearances are constrained to agree.

Operation 656 includes combining the second appearance representations to define an agreed appearance representation. As an example, in implementations in which the second appearance representations are described in the form of Gaussian distributions, each of the Gaussian distributions represents a vote as the what the geometric capsule is, and the votes from the different viewpoints are combined by taking a product of the Gaussian distributions as previously described with respect to Equation 14.

Operation 657 includes updating the feature representation for the geometric capsule based on the agreed appearance representation. For example, the feature representation for the geometric capsule may be updated to be equal to the agreed appearance representation that was defined in operation 656.

As described with respect to the process 540 of FIG. 5, multiple iterations of the process 650 may be performed, for example, as part of updating feature representations in operation 544 of the process 540.

Figure 7:
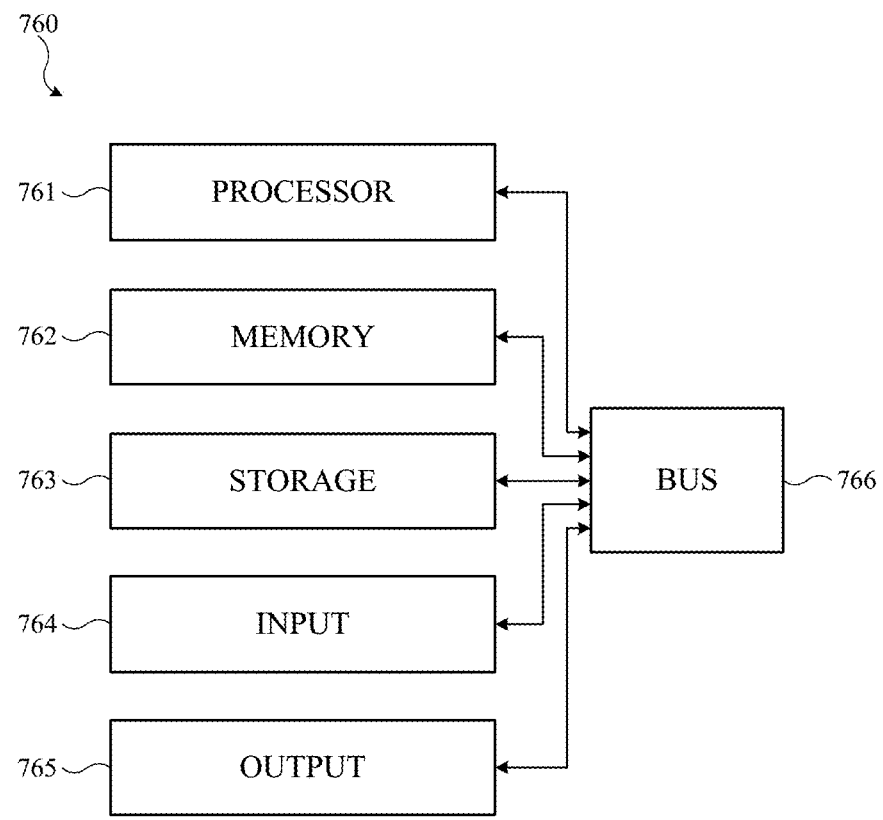
FIG. 7 is an illustration that shows an example of a hardware configuration for a computing device.

FIG. 7 is an illustration that shows an example of a hardware configuration for a computing device that can be used to implement the systems described herein, including the part encoder 320 and the object encoder 430. The computing device 760 may include a processor 761, a memory 762, a storage device 763, one or more input devices 764, and one or more output devices 765. The computing device 760 may include a bus 766 or a similar device to interconnect the components for communication. The processor 761 is operable to execute computer program instructions and perform operations described by the computer program instructions. As an example, the processor 761 may be or include one or more conventional processing devices of any type, such as a central processing unit, a field-programmable gate array, or an application specific. The memory 762 may be a volatile, high-speed, short-term information storage device such as a random-access memory module. The storage device 763 may be a non-volatile information storage device such as a hard drive or a solid-state drive. The input devices 764 may include any type of human-machine interface such as buttons, switches, a keyboard, a mouse, a touchscreen input device, a gestural input device, or an audio input device. The output devices 765 may include any type of device operable to provide an indication to a user regarding an operating state, such as a display screen or an audio output.

As described above, one aspect of the present technology is the gathering and use of data available from various sources to generate representations of objects. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, present technology could be used to capture, modify, and display a three-dimensional avatar that represents a user. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide personal information. In yet another example, users can select to limit the length of time that personal information is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   receiving three-dimensional geometric elements as an input;
   initializing geometric capsules by assigning one of the three-dimensional geometric elements to each of the geometric capsules, setting an initial value for a pose component of each of the geometric capsules, and setting an initial value for a feature component of each of the geometric capsules;
   performing one or more iterations of a routing procedure, including:
      assigning an additional one of the three-dimensional geometric elements to a respective one of the geometric capsules, based on correspondence of the additional one of the three-dimensional geometric elements to a surface defined based on the feature component of the respective one of the geometric capsules, and
      updating the feature component of each of the geometric capsules based on the three-dimensional geometric elements assigned to each of the geometric capsules; and
   outputting the geometric capsules, such that the geometric capsules include encoded three-dimensional data that is interpretable by a capsule neural network.

2. The method of claim 1, wherein initializing the geometric capsules includes:
   setting the initial value for a translational position of the pose component of each of the geometric capsules according to the translational position of the assigned one of the three-dimensional geometric elements.

3. The method of claim 1, wherein initializing the geometric capsules includes:
   setting the initial value for a rotational position of the pose component of each of the geometric capsules to one of a random value or a default value.

4. The method of claim 1, wherein assigning one of the three-dimensional geometric elements to each of the geometric capsules is performed using farthest point sampling.

5. The method of claim 1, wherein performing the one or more iterations of the routing procedure further includes:
   determining that an additional iteration of the assignment and routing procedure will be performed if any of the three-dimensional geometric elements are not assigned to one of the geometric capsules.

6. The method of claim 1, wherein performing the one or more iterations of the routing procedure further includes:
   determining routing probabilities for three-dimensional geometric elements that each describes a probability of routing a respective one of the three-dimensional geometric elements to the respective one of the geometric capsules that it is assigned to.

7. The method of claim 6, wherein performing the one or more iterations of the routing procedure further includes:
   determining that an additional iteration of the assignment and routing procedure will be performed if one or more of the routing probabilities is below a threshold value.

8. A non-transitory computer-readable storage device including program instructions executable by one or more processors that, when executed, cause the one or more processors to perform operations, the operations comprising:
   receiving three-dimensional geometric elements as an input;
   initializing geometric capsules by assigning one of the three-dimensional geometric elements to each of the geometric capsules, setting an initial value for a pose component of each of the geometric capsules, and setting an initial value for a feature component of each of the geometric capsules;
   performing one or more iterations of a routing procedure, including:
      assigning an additional one of the three-dimensional geometric elements to a respective one of the geometric capsules, based on correspondence of the additional one of the three-dimensional geometric elements to a surface defined based on the feature component of the respective one of the geometric capsules, and updating the feature component of each of the geometric capsules based on the three-dimensional geometric elements assigned to each of the geometric capsules; and outputting the geometric capsules, such that the geometric capsules include encoded three-dimensional data that is interpretable by a capsule neural network.

9. The non-transitory computer-readable storage device of claim 8, wherein initializing the geometric capsules includes:
setting the initial value for a translational position of the pose component of each of the geometric capsules according to the translational position of the assigned one of the three-dimensional geometric elements.

10. The non-transitory computer-readable storage device of claim 8, wherein initializing the geometric capsules includes:
setting the initial value for a rotational position of the pose component of each of the geometric capsules to one of a random value or a default value.

11. The non-transitory computer-readable storage device of claim 8, wherein assigning one of the three-dimensional geometric elements to each of the geometric capsules is performed using farthest point sampling.

12. The non-transitory computer-readable storage device of claim 8, wherein performing the one or more iterations of the routing procedure further includes:
determining that an additional iteration of the assignment and routing procedure will be performed if any of the three-dimensional geometric elements are not assigned to one of the geometric capsules.

13. The non-transitory computer-readable storage device of claim 8, wherein performing the one or more iterations of the routing procedure further includes:
determining routing probabilities for three-dimensional geometric elements that each describes a probability of routing a respective one of the three-dimensional geometric elements to the respective one of the geometric capsules that it is assigned to.

14. The non-transitory computer-readable storage device of claim 13, wherein performing the one or more iterations of the routing procedure further includes:
determining that an additional iteration of the assignment and routing procedure will be performed if one or more of the routing probabilities is below a threshold value.

15. A system, comprising:
a memory that includes program instructions; and
a processor that is operable to execute the program instructions, wherein the program instructions, when executed by the processor, cause the processor to:
receive three-dimensional geometric elements as an input;
initialize geometric capsules by assigning one of the three-dimensional geometric elements to each of the geometric capsules, setting an initial value for a pose component of each of the geometric capsules, and setting an initial value for a feature component of each of the geometric capsules;
perform one or more iterations of a routing procedure, in which the instructions cause the processor to:
assign an additional one of the three-dimensional geometric elements to a respective one of the geometric capsules, based on correspondence of the additional one of the three-dimensional geometric elements to a surface defined based on the feature component of the respective one of the geometric capsules, and
update the feature component of each of the geometric capsules based on the three-dimensional geometric elements assigned to each of the geometric capsules; and
output the geometric capsules, such that the geometric capsules include encoded three-dimensional data that is interpretable by a capsule neural network.

16. The system of claim 15, wherein the instructions to initialize the geometric capsules include instructions that cause the processor to:
set the initial value for a translational position of the pose component of each of the geometric capsules according to the translational position of the assigned one of the three-dimensional geometric elements.

17. The system of claim 15, wherein the instructions to initialize the geometric capsules include instructions that cause the processor to:
set the initial value for a rotational position of the pose component of each of the geometric capsules to one of a random value or a default value.

18. The system of claim 15, wherein the instructions cause the processor to assign one of the three-dimensional geometric elements to each of the geometric capsules using farthest point sampling.

19. The system of claim 15, wherein the instructions to perform the one or more iterations of the routing procedure further include instructions to:
determine that an additional iteration of the assignment and routing procedure will be performed if any of the three-dimensional geometric elements are not assigned to one of the geometric capsules.

20. The system of claim 15, wherein the instructions to perform the one or more iterations of the routing procedure further include instructions to:
determine routing probabilities for three-dimensional geometric elements that each describes a probability of routing a respective one of the three-dimensional geometric elements to the respective one of the geometric capsules that it is assigned to, and
determine that an additional iteration of the assignment and routing procedure will be performed if one or more of the routing probabilities is below a threshold value.

* * * * *